No. 607,606. L. F. PARKS. Patented July 19, 1898.
BICYCLE.
(Application filed May 10, 1897.)
(No Model.)
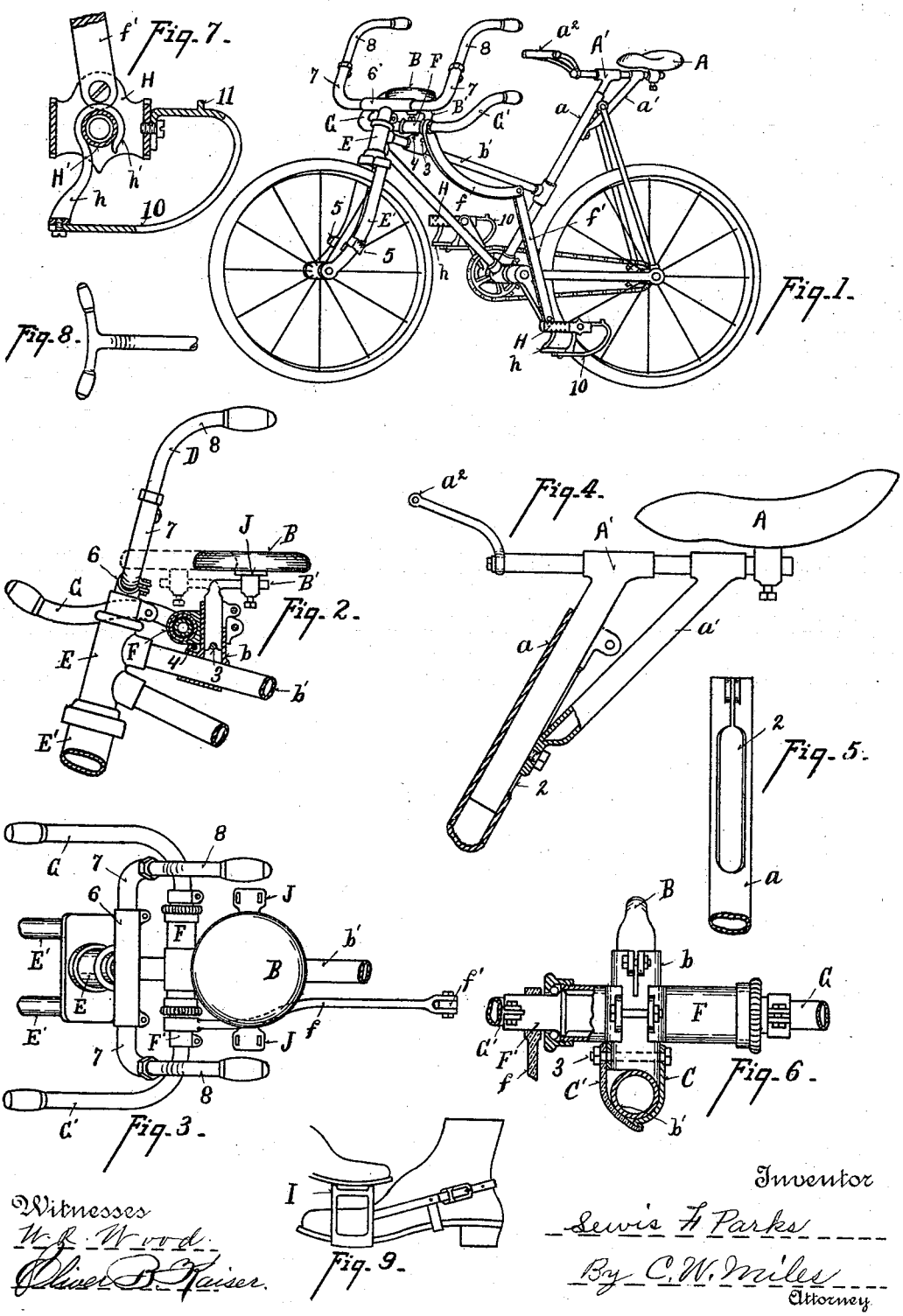

UNITED STATES PATENT OFFICE.

LEWIS F. PARKS, OF CINCINNATI, OHIO.

BICYCLE.

SPECIFICATION forming part of Letters Patent No. 607,606, dated July 19, 1898.

Application filed May 10, 1897. Serial No. 635,772. (No model.)

*To all whom it may concern:*

Be it known that I, LEWIS F. PARKS, a citizen of the United States, residing at Cincinnati, in the county of Hamilton and State of Ohio, have invented certain new and useful Improvements in Bicycles, of which the following is a specification.

My invention relates to improvements in bicycles. Its object is, first, to provide a bicycle adapted to carry an additional person or heavy package, if desired; second, to adapt a bicycle so as to be simultaneously operated by two persons and readily convertible, so as to be used by one person; third, in providing improved means for propelling the bicycle, and, fourth, in the several details of construction for accomplishing said objects, all of which will be fully set forth in the description of the accompanying drawings, making a part of this specification, in which—

Figure 1 is a perspective view of my bicycle in position to be simultaneously propelled by two persons facing each other. Fig. 2 is an enlarged side elevation, partly in section, of the forward part of the frame and forward saddle arranged so that both riders face forward. Fig. 3 is a top plan view of Fig. 2. Fig. 4 is an enlarged detail view, partly in section, of the rear saddle and support. Fig. 5 is a rear elevation of the rear saddle-post socket. Fig. 6 is a rear elevation, partly in section, of the forward saddle-post socket and attachments. Fig. 7 is a central vertical section through one of the pedals. Fig. 8 shows a modified form of handle-bar for the use of the additional rider when facing rearward. Fig. 9 shows a modified pedal-support for the additional rider.

A represents the rear saddle; A', the rear saddle-post; $a$, the saddle-post socket; $a'$, a brace or additional support for the saddle, and $a^2$ a spade handle-bar for the use of the operator on the forward saddle when facing rearward. As shown in Figs. 4 and 5, brace $a'$ is bolted to the lower end of post A' through a slot 2 in socket $a$, so that the post may be adjusted up and down in the socket the length of slot 2.

B represents the forward saddle, which is supported upon a post B', supported in sockets $b$, which is detachably connected to the frame-piece $b'$ of the bicycle. (See Figs. 2 and 6.)

C C' represent sections of a clamp held together by through-bolts 3 4. The lower end of the post B' is notched, as shown in Fig. 2, and rests on bolt 3, which prevents its rotating in the socket. As shown in Fig. 2, the saddle is set for the rider to face forward, sitting between the handle-bars D with his feet resting on the clips 5, secured to the front fork. By lifting the saddle-post so that the notch in its lower end clears bolt 3 it can be turned to position, dotted lines, Fig. 2, which is the position when the rider desires to face rearward and place his feet on the pedals to assist in propelling the bicycle.

The head E, in which the front fork E' turns, is made as short as possible and the handle-bars D fork immediately above the head. These handle-bars are formed of sections 6 7 8 telescopically adjustable one within the other and provided with suitable clamping mechanism to hold the sections in the adjusted position. By this means the horizontal distance between the handles and also the height of the handles may be changed, as desired, to afford space between the handle-bars for the forward rider.

Secured beneath the forward saddle I have shown a head F, within which is journaled a crank-shaft F'.

G G' represent hand-levers for reciprocating crank-shaft F'.

$f$ represents a crank-arm connected by means of link $f'$ with one of the pedals H.

In Fig. 1 I have shown the levers G G' adjusted to be used by the forward rider while facing rearwardly, while in Figs. 2 and 3 I have shown levers G G' adjusted for use when the forward rider is facing forward. I have shown the head F clamped around the socket of the forward seat-post, which is the preferred method of attachment, as both parts may then be removed at once from the frame, if desired.

In Fig. 7 I have shown the ordinary pedal H provided with a detachable stirrup $h$, which is supported by hooks $h'$, passing over the pedal-stem H' and held in place laterally by arm 10, clamped to one of the wings of the pedal.

Fig. 8 shows a forked handle-bar, which may be employed in place of the spade-handle $a^2$, and when thus formed will serve as a back-rest to the forward rider when facing forward.

It is often desired to carry children on the forward seat who are unable to reach the stirrup $h$. I therefore provide in Fig. 9 a clip I, which is strapped or otherwise secured to the shoe of the rider on the rear saddle, the top of the clip forming a rest for the foot of the rider on the forward saddle.

J represents a metal cross-arm projecting from beneath the forward saddle and provided with slots through which a strap may be passed to secure heavy packages to the saddle. This arm J may be set at right angles to the position shown, if desired, and is preferably detachably secured to the seat.

In the use of the pedal, Fig. 7, by both riders there is a tendency when pressure is applied to stirrup $h$ to cant the pedal on its journal, tending to interfere with the use of the pedal H by the other rider. This tendency is counteracted by extending the arm 10 rearwardly under the instep or heel of the rider, and I preferably provide a spur 11 thereon to engage the instep.

I am aware that seats for children have been secured above the handle-bars of the ordinary bicycle, and I do not claim such construction.

Having described my invention, what I claim is—

1. In a bicycle a saddle located over the rear wheel in position to operate the pedals in the usual manner, a seat located over the forward wheel between handle-bars branching from beneath said forward saddle, and extending upward and rearward to be used by the rear rider, a rock-shaft journaled in bearings clamped to the main frame beneath said seat, hand-levers, in position to be used by the forward rider, for reciprocating said rock-shaft, and a crank-arm and connecting-link connection with and transmitting motion to one of the pedals, substantially as specified.

2. A bicycle-pedal composed of the main pedal H, stirrup $h$ depending therefrom and brace-arm 10 provided with spur 11, substantially as specified.

3. In a bicycle a saddle located over the rear wheel in position to operate the pedals in the usual manner, a seat located over the forward wheel, a rock-shaft journaled in bearings clamped to the main frame beneath said seat, hand-levers in position to be used by the forward rider for reciprocating said rock-shaft, a crank-arm and connecting-link connected with and transmitting motion to one of the pedals, and rests upon the front fork to receive the feet of the forward rider, substantially as specified.

In testimony whereof I have hereunto set my hand.

LEWIS F. PARKS.

Witnesses:
OLIVER B. KAISER,
C. W. MILES.